United States Patent
Ganganna

(10) Patent No.: US 8,744,059 B2
(45) Date of Patent: *Jun. 3, 2014

(54) METHOD AND SYSTEM FOR PROVIDING INTELLIGENT CALL REJECTION AND CALL ROLLOVER IN A TELEPHONY NETWORK

(75) Inventor: Basavaraju Ganganna, Broken Arrow, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1044 days.

This patent is subject to a terminal disclaimer.

(21) Appl. No.: 11/760,395

(22) Filed: Jun. 8, 2007

(65) Prior Publication Data

US 2008/0304637 A1 Dec. 11, 2008

(51) Int. Cl.
*H04M 3/42* (2006.01)
(52) U.S. Cl.
USPC .................................. 379/211.01; 379/211.02
(58) Field of Classification Search
USPC ............ 379/201.01, 215.01, 210.01, 211.01, 379/211.02, 212.01, 212.02, 142.01, 142.15
See application file for complete search history.

(56) References Cited

U.S. PATENT DOCUMENTS

| | | | |
|---|---|---|---|
| 6,018,671 A * | 1/2000 | Bremer | 455/567 |
| 6,047,057 A * | 4/2000 | Weishut et al. | 379/215.01 |
| 6,724,872 B1 * | 4/2004 | Moore et al. | 379/93.35 |
| 7,587,039 B1 * | 9/2009 | Koch | 379/211.01 |
| 7,957,515 B1 * | 6/2011 | Weiss | 379/210.02 |
| 8,081,745 B2 * | 12/2011 | Burrell et al. | 379/201.1 |
| 2002/0146105 A1 * | 10/2002 | McIntyre | 379/211.02 |
| 2004/0203794 A1 * | 10/2004 | Brown et al. | 455/445 |
| 2004/0213396 A1 * | 10/2004 | MacNamara et al. | 379/210.02 |
| 2005/0123118 A1 * | 6/2005 | Terry et al. | 379/211.02 |
| 2005/0180407 A1 | 8/2005 | Kim | |
| 2005/0243987 A1 * | 11/2005 | Polouchkine et al. | 379/201.01 |
| 2006/0098792 A1 * | 5/2006 | Frank et al. | 379/70 |
| 2007/0047529 A1 | 3/2007 | Ricciardi et al. | |

FOREIGN PATENT DOCUMENTS

WO WO-2008/005924 1/2008

* cited by examiner

*Primary Examiner* — Oleg Asanbayev

(57) ABSTRACT

A system and method may include receiving a call connection request associated with a calling device over a telephony network, the call connection request requesting establishment of a telephone call. The system and method may further include presenting a plurality of call rejection options, each of the plurality of call rejection options being associated with separate call rejection messages, and determining which one of the plurality of call rejection options is selected, where the plurality of call rejection options permit a called party to intelligently reject a phone call.

12 Claims, 4 Drawing Sheets

METHOD AND SYSTEM FOR PROVIDING INTELLIGENT CALL REJECTION AND CALL ROLLOVER IN A TELEPHONY NETWORK

CROSS REFERENCE TO RELATED APPLICATIONS

This application is related to U.S. Non-Provisional patent application Ser. No. 11/760,419 filed concurrently herewith, titled "Method and System for Providing Intelligent Call Rejection and Call Rollover in a Data Network," the contents of which are hereby incorporated by reference in their entirety.

BACKGROUND INFORMATION

Many problems exist when a customer of a telephone service provider receives a phone call and wants to reject the incoming phone call. In conventional systems, a customer is limited to sending the caller to a voice mail system or not answering the call. For example, a business customer may be in a meeting or a customer may be in a place where cell phones are not encouraged (e.g., in a movie theater, conference, class, hospital, etc.). If the customer is expecting an important call, the options available for the customer in conventional systems are to: (1) ignore the call by pressing an ignore button ultimately directing the call to voicemail, and then return the call whenever possible; (2) take the call and inform the calling party that he or she will call back at a more appropriate time; or (3) not answer the call.

Other conventional passive call rejection options which are available for landline customers are: adding a list of phone numbers to a rejection call list and a switch automatically sends out a reject message when a call is received from any number on the rejection call list; pressing a reject button to reject a call; and anonymous call rejection setup (*77) which automatically rejects numbers without caller identification ("caller ID").

There are many disadvantage to the above options, several of which are discussed below. Referring to option (1), if the caller urgently needs to speak with the customer and does not know if the voice message or call has been received, the caller may try calling the customer multiple times. Referring to option (2), the customer may take the call even though it may be intrusive to others and may distract those sitting nearby.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Figure 1:
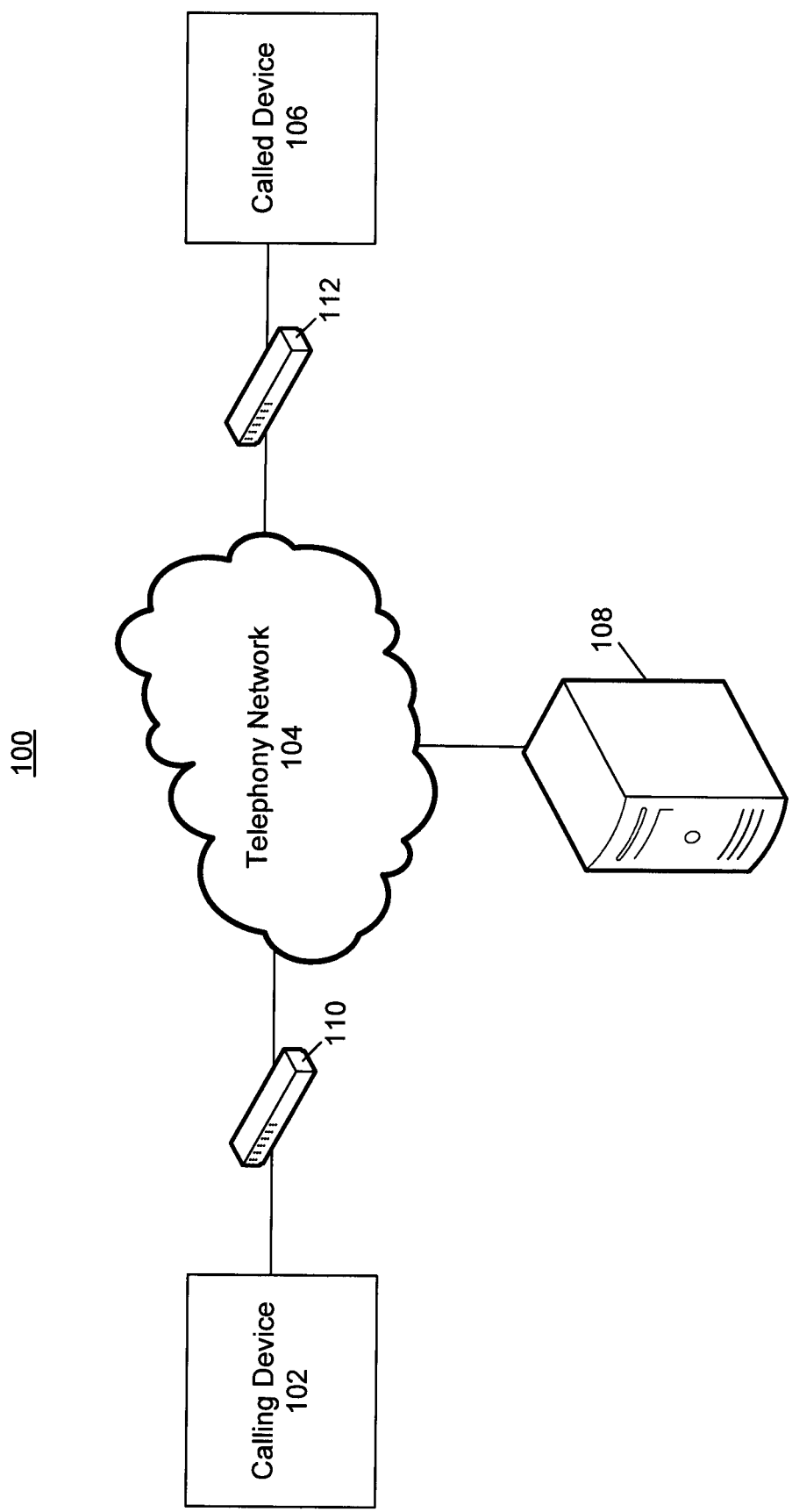
FIG. 1 is a system in accordance with exemplary embodiments of the present disclosure.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A method and system in accordance with exemplary embodiments may include receiving a call connection request associated with a calling device over a telephony network, the call connection request requesting establishment of a telephone call. The system and method may further include presenting a plurality of call rejection options, each of the plurality of call rejection options being associated with separate call rejection messages, and determining which one of the plurality of call rejection options is selected.

The description below describes servers, calling devices, called devices, message platforms, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, calling devices, called devices, etc.) separately. The functions described as being performed at various components may be performed at other components, and the various components may be combined and/or separated. Other modifications also may be made.

An enhancement or product improvement in accordance with exemplary embodiments of the present disclosure may permit a called party to convey a call rejection message to an incoming caller. The call rejection message may take various forms. For example, the call rejection message may be a message including video, audio, text, and/or combinations thereof. The called party may select the call rejection message to intelligently reject the call. Intelligent call rejection may permit the called party to select from one of many call rejection options at the time the phone call is received. The call rejection message may permit the called party to convey additional information to the caller when the phone call is received, as opposed to conventional systems that only permit a called party to accept a call or send the call to a voice messaging system. The call rejection message may indicate that the called party has received the call from the incoming caller, and optionally may include information as to when or if the called party may return the call.

FIG. 1 illustrates a system in accordance with exemplary embodiments of the present disclosure. The system 100 may set up and may exchange voice signals via a telephony network. It is noted that system 100 illustrates a simplified view of various components included in a telephony system, and that other hardware devices and software not depicted may be included in the system 100. It is also noted that the system 100 illustrates only a single calling device 102, a single telephony network 104, a single called device 106, and a single message platform 108. It will be appreciated that multiple instances of these devices may be used. Moreover, the system 100 may include other devices not depicted in FIG. 1.

In an exemplary embodiment, the system 100 may include a calling device 102, a telephony network 104, a called device 106, and a message platform 108. The calling device 102 and the called device 106 may be telephones, mobile phones, wireless phones, landline phones, or other communication devices for communicating via a telephony network. The calling device 102 and the called device 106 also may be capable of communicating text, audio, video, and/or combinations thereof via the telephony network 104.

The calling device 102 may communicate with the called device 106 over the telephony network 104. The telephony network 104 may be a public switched telephone network (PSTN), a plain old telephone system (POTS), a circuit switched network, or other networks for communicating voice calls. The telephony network 104 may be a wired network, a wireless network, or a combinations thereof.

To set up a call between the calling device 102 and the called device 106, the calling device 102 may communicate a call connection request to a first switch 110 of the telephony network 104 local to the calling device 102. For example, the telephony network 104 may use a telephony protocol, such as, but not limited to, Signaling System 7 (SS7) to set up voice calls between various called devices and various calling devices. The first switch 110 may communicate via the telephony network 104 with a second switch 112 local to the called device 106. The second switch 112 may communicate the call connection request to inform the called device 106 about the phone call. It is noted that setting up phone calls over telephony networks is well known and that many different protocols and systems may be used for voice telephony.

After the call connection request is received, the called device 106 may then generate an alert signal to inform the called party about the call. For example, the alert signal may be a ring tone, a ringing pattern, audio, video, text, combinations thereof, or other manners of informing the called party about the call. In addition to informing the called party about the call, the called device 106 may present the called party with multiple call rejection options to intelligently reject the call and to permit the called party to inform the caller with information about when the called party may return the call, as will be described in further detail below.

Figure 2:
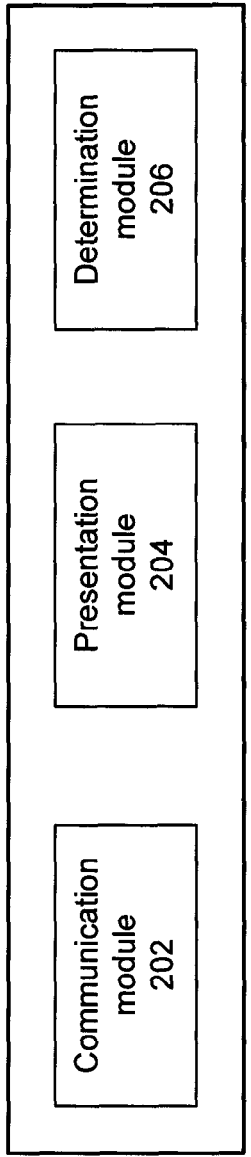
FIG. 2 is various modules of a called device in accordance with exemplary embodiments of the present disclosure.

FIG. 2 illustrates various modules of a called device in accordance with exemplary embodiments of the present disclosure. The various modules of the called device 106 may permit the called party to intelligently reject an incoming call. The called device 106 may include a communication module 202, a presentation module 204, and a determination module 206. It is noted that the modules 202, 204 and 206 are exemplary and the functions performed by one or more of the modules may be combined with that performed by other modules. The functions described herein as being performed by the modules 202, 204 and 206 also may be separated and may be performed by other modules.

The communication module 202 of the called device 106 may communicate signals to and from the telephony network 104. The communication module 202 also may communicate signals to and from the presentation module 204 and the determination module 206. When a call connection request is received from the telephony network 104, the communication module 202 may process the call connection request and may forward the call connection request to the presentation module 204.

The presentation module 204 may process the call connection request and may present call rejection options at the called device 106 to the called party. The presentation module 204 may present the call rejection options audibly, visually, textually, and/or combinations thereof. For example, presentation module 204 may provide the called party with a visual, an audible, or a textual display letting the called party know about the call and the call rejection options. The called party may use the call rejection options to permit the called party to intelligently reject the call by informing the caller that the called party has received the call and optionally as to why the called party is unable to take the phone call at this time. The presentation module 204 may present a call rejection display before or after the called party has input information at the called device 106 that the called party is going to reject the call. For example, the presentation module 204 of the called device 106 may first present the called party with an option to take the call and an option to reject the call. After selecting the option to reject the call, the presentation module 204 may present the call rejection display.

Figure 3:
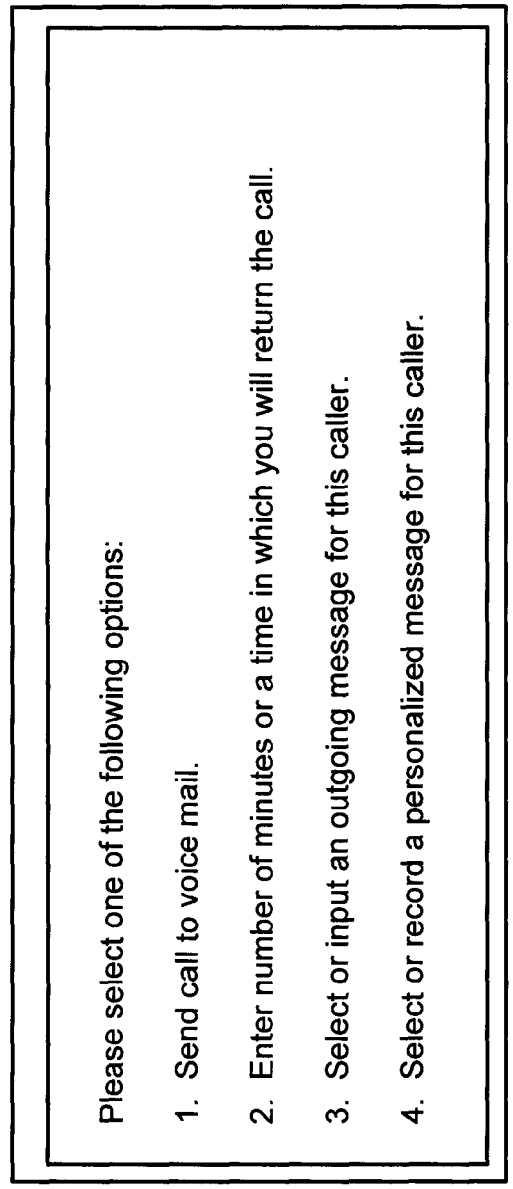
FIG. 3 is a display presented at a called device by a presentation module in accordance with exemplary embodiments of the present disclosure.

FIG. 3 illustrates a visual call rejection display presented at a called device by a presentation module in accordance with exemplary embodiments of the present disclosure. The visual call rejection display 300 may prompt the called party to select one of several call rejection options. For example, the presentation module 204 may present the visual display 300 in a graphical user interface displayed at a wireless phone, at a landline phone, etc. Additionally, the presentation module 204 may include in the visual call rejection display 300 an accept call option to permit the called party to take the call. It is noted that in addition to or instead of a visual call rejection display, the presentation module 204 also may present the call rejection options as video, text, audio, and/or combinations thereof.

In an exemplary embodiment, the visual call rejection display 300 may include four call rejection options: (1) a first call rejection option to send the call to voicemail; (2) a second call rejection option to enter a number of minutes or a time in which the called party may call the caller back; (3) a third call rejection option to select and/or input one or more output messages (e.g., audio, text, video, etc.) for this caller; and (4) a fourth call rejection option to select and/or record a personalized messages for this caller. It is noted that the call rejection options described in FIG. 3 are exemplary. Other call rejection options may be presented, and the presentation module 204 may present more or fewer call rejection options based on the system used or the preferences of the called party.

To select the desired call rejection option, the called party may use a key on a keypad (e.g., depress a key, scroll a wheel, etc.), may press a button on the called device 106, may speak a selection, may use a motion (e.g., the called device 106 may include a gyroscope or other motion detector to detect when the called party moves the called device 106 a certain angle, or shakes, swings, maneuvers, and/or otherwise moves the called device 106, etc.), or may use other manners of selecting between the different call rejection options. For example, the called party may press a key on a keypad to select the second option (e.g., select a "2" key), and may then select number keys on a keypad to enter a number of minutes (e.g., a "1" key followed by a "0" key to input ten minutes).

The called party may select the call rejection options to instruct the message platform 108 as to how to intelligently reject the call. Selecting the first call rejection option may cause the called device 106 to generate a call transfer message to roll the call over to the message platform 108 to send the call to voicemail. The call transfer message may transfer the call to the message platform 108, and may instruct the message platform 108 on how to handle the call. The call transfer message will be discussed in further detail below.

If the second call rejection option is selected, the presentation module 204 may present the called party with an interface (e.g., graphical, audible, etc.) at the called device 106 that permits the called party to input a length of time (e.g., minutes, hours, days, etc.) or a return call time (e.g., 4:30 P.M.) in which the called party may return the call. For example, the called party may select a number key "1" followed by a number key "0" on a keypad of the called device 106, optionally followed by a "#" key to input ten minutes as a length of time. The presentation module 204 also may present predefined time intervals (e.g., 10 minutes, 20 minutes, tomorrow, etc.) in the interface for selection by the called party. The presentation module 204 may include the entered length of time, the return call time, or the predefined time interval in a time parameter. The called device 106 may then generate and forward a call transfer message that includes the second call rejection option and the time parameter to roll the call over to the message platform 108.

Upon selecting the third call rejection option, the presentation module 204 may present the called party with an interface (e.g., graphical, audible, etc.) at the called device 106 that provides the called party with a choice between one or more outgoing messages. The outgoing messages may be stored at the called device 106 or may be stored at the message platform 108. The outgoing message may be, for example, an ASAP message indicating that called party may return the call as soon as possible. The outgoing message may be created by the called party prior to or after receiving the call connection request. The presentation module 204 of the called device 106 also may present predefined outgoing messages that the called party may select.

Once the called party selects one of the outgoing messages, the called device 106 may generate and forward a call transfer message to roll the call over to the message platform 108. The call transfer message also may include the third call rejection option and an outgoing message parameter. The outgoing message parameter may indicate whether the call transfer message includes the outgoing message. Also, the message platform 108 may store multiple outgoing messages in a database associated with a telephone number of the called device 106, and the message platform 108 may identify a stored outgoing message based on the outgoing message parameter of the call transfer message. For example, the message platform 108 may identify, retrieve, and forward the outgoing message associated with the outgoing message parameter to the calling device 102.

If the fourth call rejection option is selected, the presentation module 204 may present the called party with an interface (e.g., graphical, audible, etc.) at the called device 106 that prompts the called party to record a personalized message (e.g., an audio message, a video message, etc.) or that prompts the called party to identify a pre-recorded personalized message stored at the message platform 108. For example, the called party may use a video recorder at the called device 106 to create a video of the called party at the time the call is received stating: "Hi John, I'm at the hospital right now. I'll call you back in a little bit." The called device 106 may forward a call transfer message to roll the call over to the voicemail platform 108. The call transfer message also may include the fourth call rejection option and a personalized message parameter. The personalized message parameter may indicate that the call transfer message includes a newly recorded personalized message. Also, the called party may pre-record and may store one or more personalized messages at the message platform 108, and the message platform 108 may use the personalized message parameter to identify, retrieve, and forward the personalized message associated with the parameter to the calling device 102.

Referring again to FIG. 2, the determination module 206 may monitor a predetermined time interval after the call connection request has been received to determine if the called party has selected any of the call rejection options during the predetermined time interval. The predetermined time interval may be a length of time (e.g., a number of seconds, minutes, etc.), a number of rings, or other time intervals that may be selected by the system 100 or by the called party. If the called party does not respond within the predetermined time interval, the determination module 206 may select a default call rejection option for the called party that rolls the call to the message platform 108. For example, the default call rejection option may be the first call rejection option in FIG. 3 that identifies a default message stored at the message platform 108 that generically greets all callers (e.g., "Hi, this is Bob. Please leave me a message."). The default message may include audio, video, text, and/or combinations thereof. If the called party selects a call rejection option before the predetermined time interval expires, the determination module 206 may identify the call rejection option selected by the called party and may receive any inputs to create the parameters (e.g., outgoing message parameter, personalized message parameter, etc.) for inclusion in the call transfer message.

After the determination module 206 identifies the call rejection option selected by the called party or the default call rejection option, and receives any inputs to create the parameters, the determination module 206 may generate a call transfer message and may communicate the call transfer message to the message platform 108. The call transfer message may include the selected call rejection option or the default call rejection option. The call transfer message also may include a telephone number of the calling device 102, a telephone number of the called device 106, information for routing the call to the message platform 108, a time parameter, an outgoing message parameter, a personalized message parameter, combinations thereof, and/or other information associated with the call, the caller, or the called party.

Referring again to FIG. 1, the message platform 110 may provide a messaging system to permit a called party to intelligently reject calls received via the data network 106. The message platform 110 may be a voice platform, a server, or other computing device that may communicate call rejection messages to the calling device 102 based on information included in the call transfer message. In an exemplary embodiment, the voice platform may be a software application, hardware, or a combination of both software and hardware which may store voice messages for a telephony network. The voice platform may, for example, be used for traditional phone networks or mobile and soft switch networks. The voice platform may be a complete product permitting the user to store messages, select options to customize individual messages, handle voice message related queries, combinations thereof, and/or provide other features related to handling and managing of messages.

The call rejection messages may include an outgoing message, a length of time message, a personalized message, and/or combinations thereof, received in or identified by parameters included in the call transfer message. For example, the call rejection messages may be audio messages, text messages, video messages, and/or combinations thereof. The call rejection message may be, for example, a voice message such as, "Hi, you have reached Bob. I'm not here to answer your call right now, but please leave a message and I'll get back to you as soon as possible." In another example where the called party is expecting an important call during a meeting, the called party may pre-record a message such as, "Hi Larry, I was pulled into a meeting at the last minute that ends around 4:30 today. I'll call you as soon as I'm done."

The message platform 108 may permit the called party to select certain times during a day as to when different call rejection messages are active. The called party may specify time periods during which a particular call rejection message is active and may specify an expiration time/date for particular call rejection messages. For example, a called party may be expecting an important call from Bob. The called party may be in a meeting that will last until 11:00 am on May 12. The called party may pre-record a video message for Bob and may indicate that the message is active until 11:00 A.M. on May 12. When a call transfer message is received, the message platform 108 may examine whether the pre-recorded message is active at the time the call transfer message is received, and may communicate the pre-recorded message to the calling device 102 if the pre-recorded message is active. Otherwise, the message platform 108 may use a default message. The called party may use a graphical or audible interface at the called device 106 or at a computing device (not shown) to input (e.g., textually, audibly, etc.) or select during which time periods a particular call rejection message is active. In other exemplary embodiments the called party may use an Internet-based interface to select and record call rejection messages. Other interfaces also may be used.

In an exemplary embodiment, the message platform 108 may include one or more local or remote databases that store one or more call rejection messages. The message platform 108 may index the database based on a telephone number of the called device 106 to retrieve data and/or messages associated with the called party. The message platform 108 also may use parameters included in the call transfer message to index the database to identify and retrieve call rejection messages stored in the database. Additionally, the call rejection messages may be associated with a telephone number of the calling device 102, a call rejection option, combinations thereof, and/or other information associated with the call, the calling device 102, and the called device 106 for indexing the database.

When the message platform 108 receives a call transfer message that includes the first call rejection option, the message platform 108 may access a call rejection message that the called party may use to generically greet all callers. The message platform 108 may index the database based on a telephone number of the called device 106 and on the first call rejection option to identify the call rejection messages associated with the first call rejection option. For example, the call rejection message associated with the first call rejection option may be a textual message, a video message, an audio message, and/or combinations thereof that states "Hello, you have reached Bob's cell phone. Please leave me a message and I'll call you back."

When the message platform 108 receives a call transfer message that includes the second call rejection option and a time parameter, the message platform 108 may access a call rejection message that the called party may use to greet all callers and also that identifies the length of time in which the called party intends to return the call. The message platform 108 may index the database based on a telephone number of the called device 106 and on the time parameter to identify a call rejection message. For example, the call rejection message may be a textual message, a video message, an audio message, and/or combinations thereof that includes "I received your message. I will call back in 10 minutes," where the time interval may be spoken by a computerized voice or by the called party. In another example, the message platform 108 may index the database to retrieve a personal greeting for the caller based on a telephone number of the calling device 102, a telephone number of the called device 106, and the time parameter. The call rejection message may include "Hi Bob, I'm in a meeting right now. I will call you back in 25 minutes."

When the message platform 108 receives a call transfer message that includes the third call rejection option and an outgoing message parameter, the message platform 108 may determine whether an outgoing message is included in the outgoing message parameter or whether the outgoing message parameter may be used to index the database of the message platform 108. If the outgoing message is included in the outgoing message parameter, the message platform 108 may communicate a call rejection message including the outgoing message to the calling device 102. If the outgoing message is not included, the message platform 108 may index the database based on a telephone number of the called device 106 and on the outgoing message parameter to retrieve the outgoing message. The message platform 108 may then communicate a call rejection message including the outgoing message to the calling device 102. For example, the call rejection message may include a text message that states "I received your message. I will call you back as soon as possible."

When the message platform 108 receives a call transfer message that includes the fourth call rejection option and a personalized message parameter, the message platform 108 may determine whether a personalized message is included in the personalized message parameter or whether the personalized message parameter may be used to index the database of the message platform 108. If the personalized message is included, the message platform 108 may communicate a call rejection message including the personalized message to the calling device 102. If the personalized message is not included, the message platform 108 may index the database based on a telephone number of the called device 106, based on the personalized message parameter, and based on a telephone number of the calling device 102 to retrieve the personalized message. The message platform 108 may then communicate a call rejection message including the personalized message to the calling device 102. For example, the call rejection message may be a video message, an audio message, and/or combinations thereof that includes "Hi Bob. I received your message. I will call back at 4:30 after my meeting is over."

After the message platform 108 identifies and/or generates the call rejection message, the message platform 108 may communicate the call rejection message to the calling device 102 via the telephony network 104. The calling device 102 may receive and may present the call rejection message to the caller. For example, the calling device 102 may present the call rejection message as audio, video, text, and/or combinations thereof. The call rejection message may inform the caller that the called party received the call, and may inform the caller with information as to why the called party rejected the call.

After the caller has received the call rejection message, the message platform 108 may present the caller with an option to leave a message with the message platform 108 or terminate the call. For example, the caller may receive the call rejection message indicating that the called party will call the caller back in ten minutes. If this is acceptable to the caller, the caller may end the call and may wait for ten minutes. If waiting ten minutes causes a problem or the caller would like to leave a message for the called party, the caller may communicate a message (e.g., voice message, video message, text message, etc.) to the message platform 108. For example, the caller may communicate a voice message stating that the caller is unavailable in ten minutes, but will call back in thirty minutes. When the caller decides to end the call, the calling device 102 may terminate the call with the message platform 108.

Figure 4:
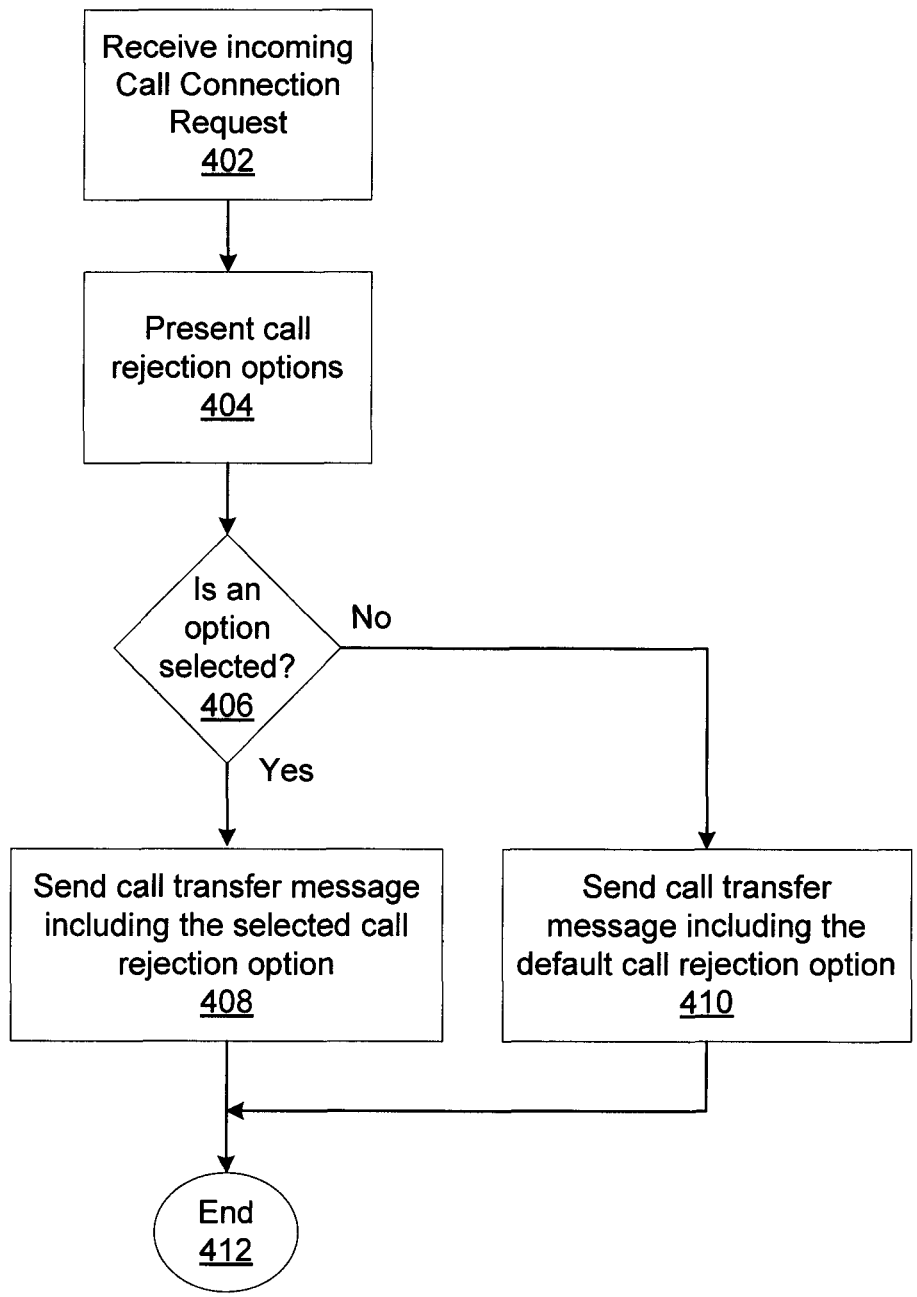
FIG. 4 is a flow diagram of a method for presenting various call rejection options to a called party in accordance with exemplary embodiments of the present disclosure.

FIG. 4 illustrates a flow diagram of a method for presenting various call rejection options to a called party in accordance with exemplary embodiments of the present disclosure. This exemplary method is provided by way of example, as there are a variety of ways to carry out methods disclosed herein. The method 400 shown in FIG. 4 can be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods or subroutines carried in the exemplary method 400. Referring to FIG. 4, the exemplary method 400 may begin at block 402.

In block 402, the called device 106 may receive an incoming call connection request from the calling device 102 via the telephony network 104. The communication module 202 of the called device 106 may process and may forward the call connection request to the presentation module 204. The method 400 may then continue to block 404.

In block 404, the presentation module 204 of the called device 106 may present the called party with various call rejection options. For example, the presentation module 204 may present a visual call rejection display to the called party including the call rejection options of FIG. 3. The method 400 may then continue to block 406.

In block 406, the determination module 206 of the called device 106 may determine whether the called party has selected any of the call rejection options within a predetermined time interval. If the called party has selected a call rejection option within the predetermined time interval, the method 400 may proceed to block 408. If the called party has not selected an option within the predetermined time interval, the method 400 may continue to block 410.

In block 408, based on the selected call rejection option, the determination module 206 may prompt the called party to input addition information and may generate a call transfer message that includes the selected call rejection option, optionally any associated parameters, and optionally information associated with the calling device 102, the call, and the called device 106. The determination module 206 may forward the call transfer message to the communication module 202 which may communicate the call transfer message to the message platform 108 via the telephone network 104. The method 400 may continue to block 412 and may end.

In block 410, the determination module 206 may generate and may communicate a call transfer message to the message platform 108 via the telephony network 104. In an exemplary embodiment, the determination module 206 may include the default call rejection option in the call transfer message due to the called party not selecting a call rejection option within the predetermined time interval. The method 400 may continue to block 412 and ends.

Figure 5:
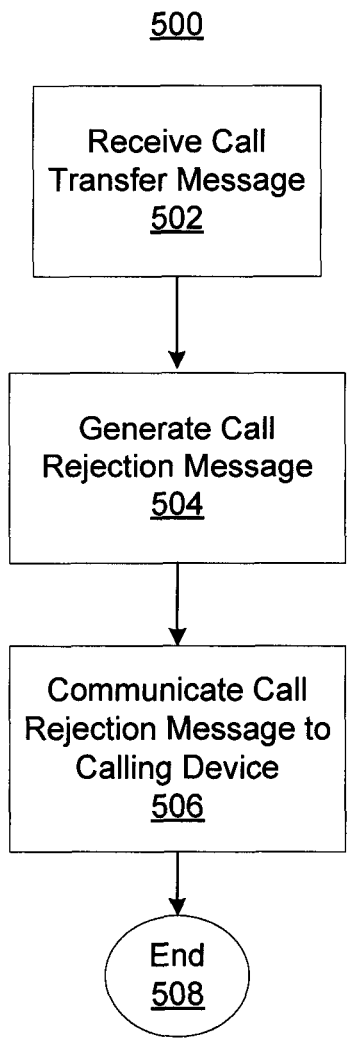
FIG. 5 is a flow diagram of a method of the processing performed by a message platform in accordance with exemplary embodiments of the present disclosure.

FIG. 5 illustrates a flow diagram of a method describing the processing performed by a message platform in accordance with exemplary embodiments of the present disclosure. The exemplary method 500 is provided by way of example, as there are a variety of ways to carry out methods disclosed herein. The method 500 shown in FIG. 5 can be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods or subroutines carried in the exemplary method 500. Referring to FIG. 5, the exemplary method 500 may begin at block 502.

In block 502, the message platform 108 may receive a call transfer message from the called device 106 via the telephony network 104. The call transfer message may include a call rejection option. The method 500 may continue to block 504.

In block 504, the message platform 108 may process the call transfer message to identify and/or generate a call rejection message. The call rejection message may be based on information included in the call transfer message or may be based on information retrieved from a database of the message platform 108. For example, the message platform 108 may process the call transfer message to identify any parameters included therein. The message platform 108 may analyze the parameters to determine whether the parameters include information for generating the call rejection message, or whether the parameters may be used to index the database. For example, the call transfer message may include an outgoing message parameter. The outgoing message parameter may include an outgoing message that the message platform 108 may extract from the call transfer message and may include in the call rejection message. In another example, the outgoing message parameter may include data for indexing a database to retrieve an outgoing message stored at the database of the message platform 108. The message platform 108 may identify and retrieve the outgoing message from the database and may include the retrieved outgoing message in the call rejection message. The method 500 may then continue to block 506.

In block 506, the message platform 108 may communicate the retrieved call rejection message to the calling device 102 via the telephony network 104. The calling device 102 may receive the call rejection message from the message platform 108 and may cause the calling device 102 to display the audio, video, text, and/or combinations thereof of the call rejection message to inform the caller that the called party has received the call and optionally as to why the called party has not answered the phone. The method 500 may then continue to 508 and ends.

The following describes an example of intelligent call rejection in accordance with exemplary embodiments of the present disclosure. In this example, a called party associated with the called device 106 is in a movie theater where cell phone usage is not encouraged. The called party of the called device 106, however, is waiting for an important phone call. In this example, the calling device 102 may communicate a call connection request to the called device 106 via the telephony network 104. The called device 106 may receive the call connection request and may present the called party with a visual call rejection display of various call rejection options for intelligently rejecting the call. For example, the called device 106 may present the called party with a first call rejection option to send the call to the message platform 108 to play a voice mail message, a second call rejection option to input a length of time, a third call rejection option to send an outgoing message to the caller, and a fourth call rejection option to record and/or select a personalized message.

After the called device 106 receives the call connection request, the determination module 206 of the called device 106 may determine whether the called party selects one of the call rejection options within the predetermined time interval. In this example, the called party selects the second call rejection option before the predetermined time interval expires and then selects a "1" key, followed by a "0" key, followed by a "#" key on a keypad of the called device 106 to input ten minutes as a length of time. The determination module 206 then generates a call transfer message that includes ten minutes as a time parameter.

The message platform 108 may receive and may analyze the call transfer message to identify the time parameter. The message platform 108 may then generate a call rejection message that includes the selected length of time (i.e., ten minutes). The call rejection message may include audio, text, video, and/or combinations thereof to inform the caller that the called party will return the call in ten minutes. The message platform 108 may communicate the call rejection message to the calling device 102 via the telephony network 104. The calling device 102 may receive and may present the call rejection message to the caller. In this example, the call rejection message may be audio that states "I will return your call in 10 minutes." The message platform 108 may present the caller with the option to terminate the phone call or to leave a message for the called party, and the caller in this example may use the calling device 102 to terminate the call.

Thus, as described in the exemplary embodiments provided herein, the system 100 may provide an intelligent call rejection process to permit called parties to intelligently reject calls and to inform callers as to why the called party has rejected the phone call.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method for communicating a call rejection over a telephony network, comprising:
   receiving, at a called device, a call connection request associated with a calling device over the telephony network, the call connection request requesting establishment of a telephone call;
   communicating the call connection request from the calling device to a second switch via a first switch of the telephony network, the second switch communicating the call connection request to inform the called device about the telephone call;
   presenting, by the called device to a called party, one or more of a plurality of call rejection options in response to receiving the call connection request, wherein the one or more of the plurality of call rejection options are associated, by a message platform, with separate call rejection messages activated based at least in part on a time of a day, wherein each of the separate call rejection messages is associated with an expiration date and an expiration time, the separate call rejection messages include an audio message, a text message, a video message or a combination thereof;
   monitoring, by the called device, a predetermined time interval after the call connection request is received to determine whether the called party selected any of the one or more of the plurality of call rejection options during the predetermined time interval, wherein the one or more of the plurality of call rejection options is selected based on receiving an input from the called party at the called device, the input of the called party being one of a voice input, a selection of a key on a keypad, and a motion input;
   determining whether one of the one or more of the plurality of call rejection options is selected by the called party during the predetermined time interval;
   communicating a call transfer message from the called device to the message platform via the telephony network, wherein the call transfer message includes:
      a default call rejection option automatically selected by the called device in response to determining that a selection has not been made by the called party within the predetermined time interval,
      a first call rejection option of the plurality of call rejection options in response to determining that the first call rejection option has been selected by the called party during the predetermined time interval, and
      at least five of: a telephone number of the calling device, a telephone number of the called device, information for routing the telephone call over the telephony network to the message platform, an outgoing message parameter, a time parameter, a personalized message parameter and other information associated with the telephone call, the calling party or the called party;
   receiving, by the message platform, the call transfer message and indexing a database based on the telephone number of the called device to identify and retrieve data and a call rejection message associated with the called party stored in the database; and
   communicating, by the message platform, the call rejection message to the calling device, the call rejection message being based on either the default call rejection option or the first call rejection option included in the call transfer message.

2. The method of claim 1, wherein the call transfer message includes the first call rejection option.

3. The method of claim 1, wherein the first call rejection option contains the personalized message parameter.

4. The method of claim 1, wherein the first call rejection option includes a parameter that identifies a time or a length of time.

5. The method of claim 1, wherein the first call rejection option includes the outgoing message parameter.

6. The method of claim 1, wherein first call rejection option contains a parameter that instructs the message platform to retrieve a personalized message.

7. The method of claim 6, wherein the personalized message is one or a combination of the audio message, the text message, or the video message.

8. The method of claim 1, wherein the input from the called party is received within the predetermined time interval after the call connection request is received.

9. The method of claim 1, wherein the call transfer message comprises the default call rejection option and the default call rejection option instructs the message platform to communicate a default message to the calling device.

10. A non-transitory computer readable media comprising code executed by a computer processor to perform the acts of the method of claim 1.

11. A system for communicating a call rejection over a telephony network, the system comprising:
   a called device communicatively coupled to the telephony network, the called device configured to:

receive a call connection request associated with a calling device via the telephony network, the call connection request requesting establishment of a telephone call, the call connection request having been communicated from the calling device to a first switch of the telephony network, from the first switch to a second switch, and from the second switch to the called device to inform the called device of the telephone call;

the called device further configured to:

present to a called party one or more of a plurality of call rejection options in response to receiving the call connection request, wherein the one or more of the plurality of call rejection options are-associated, by a message platform, with separate call rejection messages activated based at least in part on a time of a day, wherein each of the separate call rejection messages is associated with an expiration date and an expiration time, the separate call rejection messages include an audio message, a text message, a video message or a combination thereof;

monitor a predetermined time interval after the call connection request is received to determine whether the called party selected any of the one or more of the plurality of call rejection options during the predetermined time interval, wherein the one or more of the plurality of call rejection options is selected based on receiving an input from the called party at the called device, the input from the called party being one of a voice input, a selection of a key on a keypad, and a motion input;

determine whether one of the plurality of call rejection options is selected by the called party during the predetermined time interval;

communicate a call transfer message to the message platform via the telephony network, wherein the call transfer message includes:

a default call rejection option automatically selected by the called device in response to a determination that a selection has not been made by the called party within the predetermined time interval, a first call rejection option of the plurality of call rejection options in response to a determination that the first call rejection option has been selected by the called party during the predetermined time interval, and at least five of: a telephone number of the calling device, a telephone number of the called device, information for routing the telephone call over the telephony network to the message platform, an outgoing message parameter, a time parameter, a personalized message parameter, and other information associated with the telephone call, the calling party or the called party; and the message platform communicatively coupled to the telephony network, the message platform configured to:

receive the call transfer message;

index a database based on the telephone number of the called device to identify and retrieve data and a call rejection message associated with the called party stored in the database; and communicate the call rejection message to the calling device, the call rejection message being based on either the default call rejection option or the first call rejection option included in the call transfer message.

12. The method of claim 1, wherein a content of the call rejection message is based on the selected first call rejection option in response to a determination that one of the plurality of call rejection options is selected, or the default call rejection option in response to a determination that a selection has not been made.

* * * * *